United States Patent [19]

Selman

[11] 3,958,659
[45] May 25, 1976

[54] CAB TILTING MECHANISM FOR TRUCKS
[75] Inventor: Alan Albert Selman, Southend-on-Sea, England
[73] Assignee: Ford Motor Company, Dearborn, Mich.
[22] Filed: Apr. 12, 1974
[21] Appl. No.: 460,654

[52] U.S. Cl.............................. 180/89 A; 92/129; 108/7; 296/28 C; 296/35 R; 298/10; 312/327
[51] Int. Cl.² ........................................ B62D 27/04
[58] Field of Search ................. 180/89 A, 89 R; 296/35 A, 28 C, 35 R; 298/10; 92/129; 108/7; 312/327; 297/313, 328

[56] References Cited
UNITED STATES PATENTS

| 3,627,252 | 12/1971 | Yamaguchi | 297/328 |
| 3,642,316 | 2/1972 | Porth | 180/89 A |
| 3,761,123 | 9/1973 | Neill | 26/28 C |
| 3,797,883 | 3/1974 | Steiner | 180/89 A |
| 3,801,151 | 4/1974 | Reynolds | 296/28 C |

Primary Examiner—M. H. Wood, Jr.
Assistant Examiner—John P. Silverstrim
Attorney, Agent, or Firm—Clifford L. Sadler; Keith L. Zerschling

[57] ABSTRACT

According to the preferred embodiment of this invention, a cab of a tilt cab truck is mounted on a chassis frame by suspension springs. A hydraulic ram is arranged to move the cab from a riding position to a tilted position. The means connecting the ram to the cab permits free movement of the cab on its suspension springs when the cab is in its riding position and provides a restraint against movement between the ram and cab when the cab is in its tilted position.

3 Claims, 4 Drawing Figures

U.S. Patent  May 25, 1976  Sheet 1 of 2  3,958,659
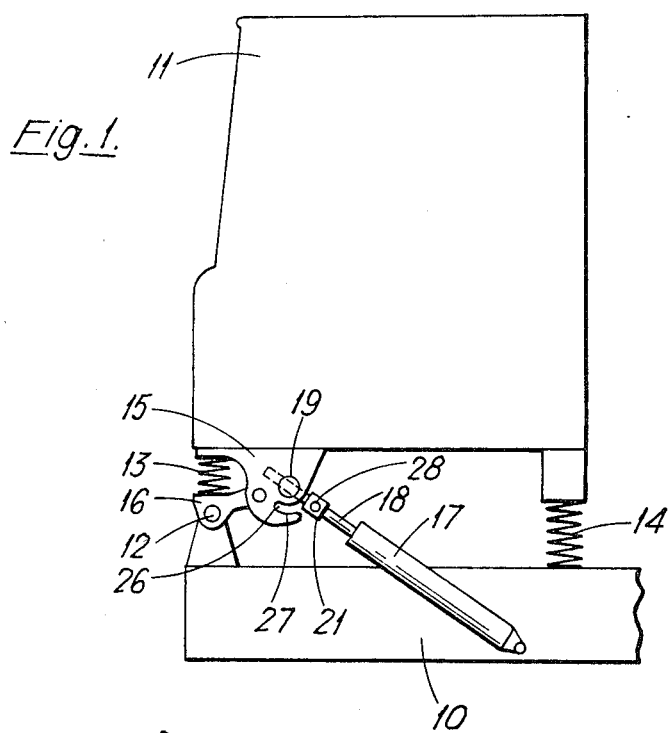
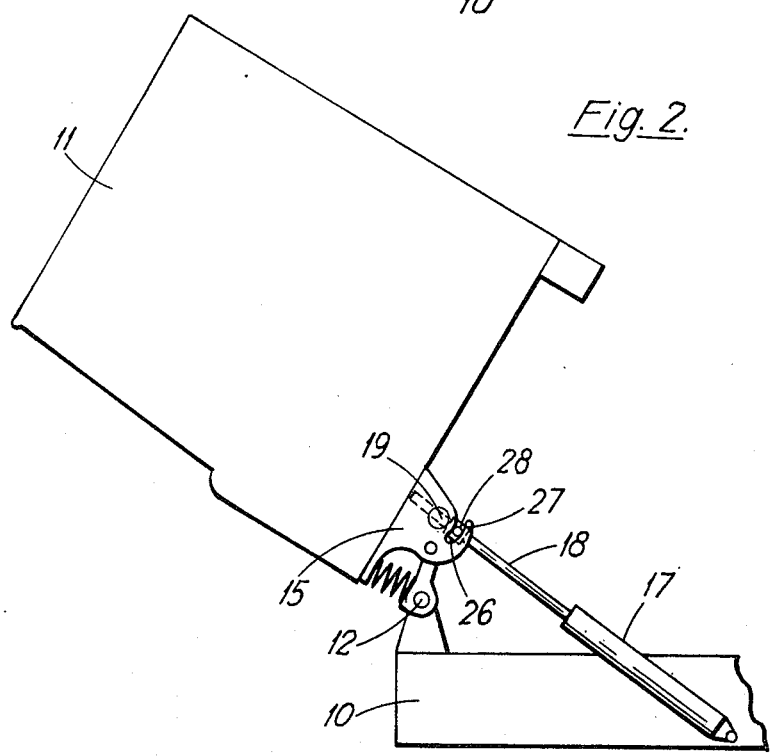

CAB TILTING MECHANISM FOR TRUCKS

BACKGROUND OF THE DISCLOSURE

This invention relates to trucks having cab tilting mechanisms. In vehicles of this class, the cab is pivotable about a transverse axis from a normal operating position to a forward position where the truck engine is exposed to facilitate servicing.

When the cab of a tilt cab truck is mounted on cab suspension springs, problems have arisen in finding a suitable method of tilting the cab. If a hydraulic ram is connected solidly between the cab and the chassis for effecting tilting movement, the ram excessively damps movement of the cab upon its suspension springs. It is known to allow free movement between the ram and the cab to avoid this problem of excessive damping. This known arrangement has the disadvantage that when the cab is tilted there is an unacceptable lurch as the mechanism takes up the free movement when the cab reaches its balance point. This lurch can strain the cab mountings.

BRIEF SUMMARY OF THE DISCLOSURE

In view of the state of the art, an improvement is provided by the present invention in tilt cab trucks and the associated tilting mechanism. According to the presently preferred embodiment of the invention, a tilt cab truck has a cab supported on a chassis by cab suspension springs. The cab is tiltable from a riding position about a tilting axis by a tilt mechanism which acts between the chassis and the cab. When the cab is in its riding position there is free movement in the tilt mechanism to allow movement of the cab relative to the chassis on its suspension. After initial tilting of the cab from its riding position, the free movement is substantially eliminated to reduce uncontrolled movement of the cab as it is tilted beyond the point at which its center of gravity is over the tilting axis.

A hydraulic ram is provided between the vehicle's chassis frame and the cab. The means connecting the ram to the cab permits free movement of the cab on its suspension springs when the cab is in its riding position and, further, it provides a restraint against movement between the ram and the cab when the cab is in its tilted position.

BRIEF DESCRIPTION OF THE DRAWINGS

The many objects and advantages of a tilt cab truck constructed in accordance with this invention will become apparent upon consideration of the following detailed description and the accompanying drawings, in which:

FIG. 1 is a side view of a truck cab and chassis arrangement embodying the invention, the cab being shown in its riding position;

FIG. 2 is a side view similar to FIG. 1 showing the cab in its fully tilted position;

DETAILED DESCRIPTION OF THE PREFERRED EMBODIMENT

Figure 3:
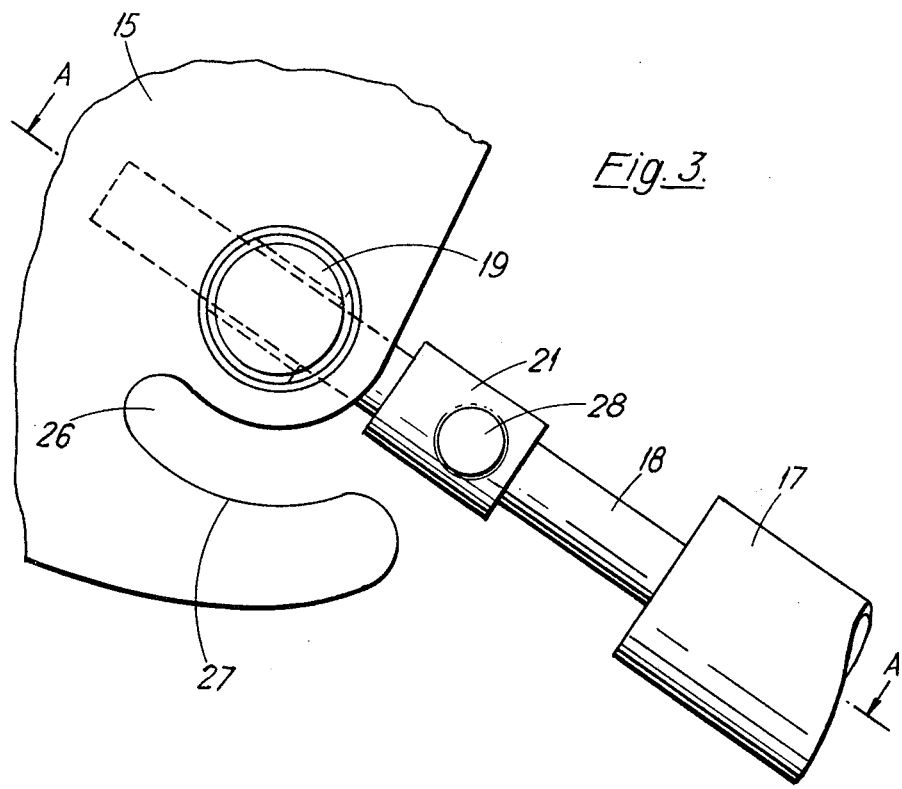
FIG. 3 is a detailed side view showing the connection between the ram piston rod and the cab suspension bracket of FIG. 1.

The several figures of the drawings illustrate the presently preferred embodiment of an improved tilt cab truck and associated tilting mechanism. The truck includes a chassis 10 and a cab 11. The cab 11 is pivotally mounted on the chassis 10 for tilting movement from the riding position illustrated in FIG. 1 to a fully tilted position shown in FIG. 2 about a transverse tilting axis provided by pivots 12.

In its riding position the cab 11 is supported by front cab suspension springs 13 and rear cab suspension springs 14. The arrangement of the cab front suspension springs 13 comprises a suspension bracket 15 mounted on the underside of the cab 11 and a suspension arm 16. The forward end of the suspension arm 16 is pivotally connected to the chassis 10 to form the tilting pivot 12. The rearward end of the suspension arm 16 is pivotally connected to the suspension bracket 15. The cap suspension spring 13 acts between the underside of the suspension bracket 15 and and the top side of the suspension arm 16. A jounce and rebound stop arrangement may be housed within the suspension spring 13 to prevent excessive extension of the spring 13 when the cab 11 is tilted.

A hydraulic ram includes a cylinder 17 pivotally connected at its lower end to the chassis 10 and a piston rod 18 pivotally connected by a trunnion 19 to the suspension bracket 15 of the cab 11.

Figure 4:
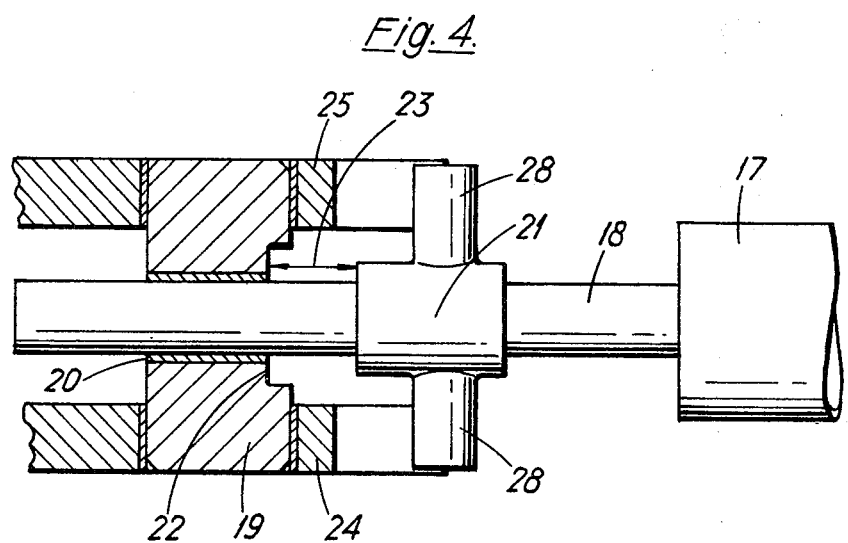
FIG. 4 is a section along the line A-A in FIG. 3.

The ram piston rod 18 is slidable in a bearing 20 in the trunnion 19 (see FIG. 4). An abutment member 21 fixed to the piston rod 18 below the suspension bracket 15 engages the trunnion at 22 to limit the upward extent of free movement 23 of the piston rod 18 relative to the trunnion 19 and hence the cab 11 when the ram is extended.

The upper end of the piston rod 18 passes between downwardly depending flanges 24 and 25 of the suspension bracket 15. Each flange 24, 25 is formed with a slot 26 that forms an arcuate ramp surface 27 substantially coaxial with the trunnion 19. Pegs 28 formed integrally with the abutment member 21 enter the slots 26 after the cab has been tilted from its riding position. The ramp surfaces 27 then prevent forward lurching of the cab relative to the piston rod and, conversely, downward free movement of the piston rod 18 relative to the cab 11.

OPERATION

When it is desired to raise the cab 11 to service the vehicle's engine, the hydraulic cylinder 17 is pressurized.

Upon extension of the ram 17 to tilt the cab 11, the abutment member 21 engages the trunnion 19 and the cab 11 is forced upwardly and forwardly. After the cab 11 has been tilted through an initial movement of approximately 30°, the pegs 28 enter the slots 26. Upon further extension of the ram 17 to tilt the cab 11 beyond its balance position in which its center of gravity passes over the pivot 12, the pegs 28 engage the ramp surface 27 and prevent any forward lurch of the cab. Subsequent tilting movement of the cab 11 continues under the control of the ram 17.

It will be appreciated that the spacing between the ramp surface 27 and the axis of the trunnion 19 in relation to the spacing between the pegs 28 and the same trunnion axis when the abutment member 21 is engaged with the trunnion 19 is such that there is substantially no free movement after the pegs 28 have entered the slots 26.

When the ram 11 is closed or retracted to lower the cab 11, the initial forces are taken up by engagement of the pegs 28 with the ramp surfaces 27 until the cab again passes its balance point. Beyond the balance point, the weight of the cab 11 is taken by engagement of the abutment member 21 with the trunnion 19. The abutment member 21 remains in engagement with trunnion 19 after the cab 11 is returned to its riding position. Subsequent deflection of the cab 11 on its suspension springs 13, 14 closes the ram 17 and establishes the free movement 23. This clearance enables free or uninhibited jounce movement of the cab 11 on its springs 13, 14 whereby good cab ride qualities are assured.

The drawings and the foregoing description disclose the cab suspension, the ram and the means connecting the ram to the cab and the chassis at the left side of the cab. It is contemplated that a similar arrangement of components will be provided on the right side of the cab. In addition, a releasable latch mechanism may be provided at the rear of the cab to hold it on the chassis when the cab is in its riding position as is known in the art.

The foregoing description presents the presently preferred embodiment of this invention. Alterations and modifications may occur to those skilled in the art that will come within the scope and spirit of the following claims.

I claim:

1. A tilt cab truck having a cab, a chassis and pivot means connecting said cab to said chassis, said cab being angularly displaceable relative to said chassis about said pivot means from a riding position to a tilted position, a hydraulic ram constructed to exert a force capable of moving said cab from said riding position to said tilted position, suspension means interposed between said cab and said chassis, said suspension means resiliently supporting said cab for jounce and rebound vertical displacement relative to said chassis, said ram having a cylinder portion with one end pivotally connected to one of said chassis and said cab, said ram having a piston rod portion slidably engaging a coupling means secured to the other of said chassis and said cab, said coupling means having a trunnion member with a transverse axis and a bearing portion slidably supporting said piston rod, said piston rod having an abutment member affixed thereto and spaced from said trunnion member allowing relative linear displacement between said piston rod and said coupling means without imposing a substantial force upon said ram when said cab is in said riding position, said abutment member being constructed to engage said trunnion member when said ram is energized to move said cab from said riding position to said tilted position, said coupling means having hook shape retaining means engaging said abutment member and preventing substantial linear displacement between said piston rod and said trunnion member and between said piston rod and said coupling member when said cab is in said tilted position.

2. A tilt cab truck having a cab, a chassis and pivot means connecting said cab to said chassis, said cab being angularly displaceable relative to said chassis about said pivot means from a riding position to a tilted position, a hydraulic ram constructed to exert a force capable of moving said cab from said riding position to said tilted position, suspension means interposed between said cab and said chassis, said suspension means resiliently supporting said cab for jounce and rebound vertical displacement relative to said chassis, said ram having a cylinder portion with one end pivotally connected to one of said chassis and said cab, said ram having a piston rod portion slidably engaging a coupling means secured to the other of said chassis and said cab, said coupling means having a trunnion member with a transverse axis and a bearing portion slidably supporting said piston rod, said piston rod having an abutment member spaced from said trunnion member allowing relative linear displacement between said piston rod and said coupling means without imposing a substantial force upon said ram when said cab is in said riding position, said abutment member being constructed to engage said trunnion member when said ram is energized to move said cab from said riding position to said tilted position, said coupling means engaging said abutment member and preventing substantial relative linear displacement between said piston rod and said coupling means when said cab is in said tilted position, said coupling means having arcuate ramp means engaging said abutment means when said cab is in said tilted position and said ram is energized to move said cab from said tilted position to said riding position whereby said ram may exert a force upon said cab to move said cab from said tilted position to said riding position.

3. A tilt cab truck according to claim 2 and including:

said arcuate ramp means being spaced apart from said abutment member when said cab is in said riding position.

* * * * *